(12) United States Patent
Moon et al.

(10) Patent No.: US 6,937,815 B1
(45) Date of Patent: Aug. 30, 2005

(54) METHOD AND APPARATUS FOR RECORDING MANUFACTURER INFORMATION AND FOR DETERMINING WHETHER THE MANUFACTURER INFORMATION IS EFFECTIVE

(75) Inventors: Seong-jin Moon, Seoul (KR); Young-nam Oh, Sungnam (KR); Tae-yun Chung, Gwachun (KR); Jung-suk Kang, Seoul (KR); Pan-gie Park, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 137 days.

(21) Appl. No.: 09/610,696

(22) Filed: Jul. 5, 2000

Related U.S. Application Data

(62) Division of application No. 09/337,253, filed on Jun. 22, 1999.

(30) Foreign Application Priority Data

| Jun. 22, 1998 | (KR) | 98-23487 |
| Jul. 29, 1998 | (KR) | 98-30753 |

(51) Int. Cl.⁷ .................. H04N 5/76; H04N 5/781
(52) U.S. Cl. .................. 386/95; 386/125; 386/126
(58) Field of Search ............... 386/1, 45, 95, 386/46, 125–126; 360/13, 18, 27, 39, 55; 369/13.01, 30, 25, 47.1, 47.15, 47.2, 47.21, 83, 124.1; 707/1–10, 100–104, 200; H04N 5/76, 5/92, 5/781

(56) References Cited

U.S. PATENT DOCUMENTS

| 5,325,370 A | | 6/1994 | Cleveland et al. | |
| 5,652,804 A | * | 7/1997 | Bronstein et al. | 382/141 |
| 5,758,355 A | * | 5/1998 | Buchanan | 707/201 |
| 6,038,366 A | * | 3/2000 | Ohno et al. | 386/46 |
| 6,292,806 B1 | * | 9/2001 | Sandifer | 707/104 |
| 6,484,233 B1 | | 11/2002 | Fujinami et al. | |
| 6,516,029 B1 | * | 2/2003 | Wang | 375/240.01 |

FOREIGN PATENT DOCUMENTS

| EP | 785 547 | 7/1997 |
| EP | 833 337 | 4/1998 |
| JP | 64-48287 | 2/1989 |
| JP | 03-286483 | 12/1991 |
| JP | 4-168664 | 6/1992 |
| JP | 5-307867 | 11/1993 |
| JP | 06-076483 | 3/1994 |
| JP | 6-197308 | 7/1994 |

(Continued)

OTHER PUBLICATIONS

U.S. Appl. No. 09/610,380, filed Jul. 5, 2000, Seong–jin Moon et al., Samsung Electronics Co., LTD.
U.S. Appl. No. 09/337,253, filed Jun. 22, 1999, Seong–jin Moon et al., Samsung Electronics Co., LTD.
U.S. Appl. No. 09/143,930, filed May 14, 2002, Seong–jin Moon et al., Samsung Electronics Co., LTD.

*Primary Examiner*—Thai Tran
(74) *Attorney, Agent, or Firm*—Stein, McEwen & Bui, LLP

(57) ABSTRACT

A recording medium and a recording apparatus for storing manufacturer information for supporting specific functions for each manufacturer and a method therefor. A reproducing apparatus for reproducing manufacturer information for supporting specific functions and a method therefor is also provided. If a recording apparatus modifies the contents of the recording medium, then it should record its manufacturer's identification code. A recording apparatus/reproducing apparatus should check the identification code on the recording medium before using its own manufacture information item for some specific function. Also, it is possible to reduce the time required to determine whether the manufacturer information items are effective.

34 Claims, 3 Drawing Sheets

| MNFI_NS | NUMBER OF MANUFACTURER INFORMATION |
| LAST_MN | MANUFACTURER'S CODE WHICH LAST MODIFIED AV CONTENTS |
| LAST_PROD | PRODUCT'S CODE WHICH LAST MODIFIED AV CONTENTS |
| OP_CD | OPERATION CODE |

FOREIGN PATENT DOCUMENTS

| | | |
|---|---|---|
| JP | 07-272461 | 10/1995 |
| JP | 7-281325 | 10/1995 |
| JP | 8-31080 | 2/1996 |
| JP | 8-63899 | 3/1996 |
| JP | 08-124362 | 5/1996 |
| JP | 8-185675 | 7/1996 |
| JP | 08-221948 | 8/1996 |
| JP | 08-227434 | 9/1996 |
| JP | 8-339663 | 12/1996 |
| JP | 9-298717 | 11/1997 |
| JP | 09-312084 | 12/1997 |
| JP | 10-262207 | 9/1998 |
| JP | 2000-057746 | 2/2000 |

* cited by examiner

| MNFI_NS | NUMBER OF MANUFACTURER INFORMATION |
| LAST_MN | MANUFACTURER'S CODE WHICH LAST MODIFIED AV CONTENTS |
| LAST_PROD | PRODUCT'S CODE WHICH LAST MODIFIED AV CONTENTS |
| OP_CD | OPERATION CODE |

FIG. 6

| | CONTENTS | NUMBER OF BYTES |
|---|---|---|
| MNFI Ns | NUMBER OF MANUFACTURER'S INFORMATION | 1 BYTE |
| MNFIT EA | END ADDRESS OF MNFIT | 4 BYTES |
| LAST MN | MANUFACTURER'S CODE WHICH LAST MODIFIED AV CONTENTS | 32 BYTES |
| LAST PROD | PRODUCT'S CODE WHICH LAST MODIFIED AV CONTENT | 32 BYTES |
| MN CD | MANUFACTURER'S CODE | 2xMNFI Ns BYTES |
| PROD CD | PRODUCT'S CODE | 2xMNFI Ns BYTES |
| FILE NAME | EXCLUSIVE FILE FOR INDIVIDUAL INFORMATION | 12xMNFI Ns BYTES |
| REC TM | RECORDED TIME | 8xMNFI Ns BYTES |

FIG. 7

| | CONTENTS | NUMBER OF BYTES |
|---|---|---|
| MNFI_SA | START ADDRESS OF MNF | 2 BYTES |

FIG. 8

| | CONTENTS | NUMBER OF BYTES |
|---|---|---|
| MNFI | MANUFACTURER'S INFORMATION | VARIABLE LENGTH BYTES |

# METHOD AND APPARATUS FOR RECORDING MANUFACTURER INFORMATION AND FOR DETERMINING WHETHER THE MANUFACTURER INFORMATION IS EFFECTIVE

This application is a divisional of U.S. application Ser. No. 09/337,253 filed Jun. 22, 1999.

CROSS-REFERENCE TO RELATED APPLICATIONS

This application claims the benefit of Korean Patent Application Nos. 98-23487, filed Jun. 22, 1998 and 98-30753, filed Jul. 29, 1998, in the Korean Patent Office, the disclosures of which are incorporated herein by reference.

BACKGROUND OF THE INVENTION

1. Field of the Invention

The present invention relates to optical recording and reproduction (recording/reproduction) of video and/or audio data. More particularly, the present invention relates to a recording medium for storing identification information of a manufacturer of a recorder which modifies the contents of the recording medium, and a recorder and/or a player which have the manufacturer specific information and a method therefor.

2. Description of the Related Art

FIG. 1 shows a one dimensional structure of a general recording medium. As shown in FIG. 1, a volume space, which is the entire recording medium, is comprised of a volume and file structure area and areas in which real data is recorded (used blocks #1, #2, and #3). Real data can be recorded in a physically scattered state by editing in a predetermined unit, such as a program or a title. General information on the disc and information on the structures of a file and a directory, as shown in FIG. 2, are recorded in the volume and file structure area.

FIG. 2 shows files existing on a file system used for an apparatus for recording and reproducing audio and/or video (A/V) data on a rewritable recording medium. A bitstream file is a file in which real A/V data is recorded. An information file is a file containing information on the bitstream file. The file system may also include a resource file.

FIG. 3 shows the contents of the information file shown in FIG. 2. The contents can be classified into formatted bitstream information having a common format among manufacturers, and manufacturer (specific) information having an individual format which is not compatible between manufacturers. The formatted information, which includes information for having a common function regardless of the manufacturer, is necessary to maintain compatibility. For example, the formatted information includes information on the starting position of a specific title in the bitstream file and information on a position corresponding to a specific time interval. The recorder and/or player obtains information on which position in the bitstream file is to be recorded and which position is to be reproduced through the formatted information and records/reproduces the bitstream file on the basis of the obtained information.

The manufacturer information that is used by each manufacturer to support specific functions of the respective manufacturer does not need to be compatible. For example, a function of recording information on the finally reproduced position in the bitstream file as the manufacturer information item and automatically reproducing from a position next to the finally reproduced position when the recording medium is reproduced later is an example of a specific function using manufacturer information. The specific function is supported only in the recording medium recorder/player which can support the manufacturer information.

In detail, as shown in FIG. 3, the contents of the manufacturer information are comprised of a manufacturer information header, for example, having information on the number of items (n) of the manufacturer information; the same number (n) of manufacturer information search pointers having information on the positions of the respective item of the manufacturer information (manufacturer information search pointer #1, . . . , manufacturer information search pointer #n); and the respective manufacturer information items (manufacturer information item #1, . . . manufacturer information item #n). A recorder/player of each manufacturer is expected to have at least one manufacturer information item.

The contents of the manufacturer information items can be understood and utilized only in the recorder/player of the specific manufacturer which generated the manufacturer information items, and are not compatible with the recorders/players of other manufacturers.

As described above, since the information for the specific function of the individual manufacturer is not compatible with information of other manufacturers, if additional recording/deleting processes are performed by a recorder/editor manufactured by a manufacturer B on a recording medium having the manufacturer information generated by a manufacturer A, the manufacturer information of the manufacturer A may not be effective any longer. Since the manufacturer information is unique to the manufacturer A, only the manufacturer A can analyze and modify the information. Thus, the manufacturer B cannot modify or manage manufacturer A's information. When a recording medium of which the contents are modified is returned to the recorder/player of the manufacturer A for more recording or reproducing, a mis-operation can occur since the information item containing the information for the specific function set by the manufacturer A may no longer be effective. Therefore, a check should always be made as to whether the manufacturer information is effective before using the manufacturer information made by the manufacturer A when a recording medium is newly loaded into a recorder/player of the manufacturer A. Verification processes are complicated and it can take a long time to perform the processes when there is a large amount of recorded A/V data.

SUMMARY OF THE INVENTION

It is a first object of the present invention to provide a recording medium for storing manufacturer information for a specific function of recorders/players of different manufacturers.

It is a second object of the present invention to provide a recording medium for storing identification information of the manufacturer of a recorder/editor which last performed recording/deleting on the recording medium.

It is a third object of the present invention to provide a recorder/editor for and method of storing on a recording medium manufacturer information for a specific function of the recorder/editor of each different manufacturer.

It is a fourth object of the present invention to provide a recorder/editor for and a method of storing on a recording medium identification information of a manufacturer of the recorder/editor which performs recording/deleting.

It is a fifth object of the present invention to provide a recorder/player for and method of using the manufacturer information stored on the recording medium for the specific function of the recorders/players of each different manufacturer.

It is a sixth object of the present invention to provide a recorder/player for and method of checking whether the identification information of the manufacturer of a recorder/editor which last performs recording/deleting on the recording medium is the same as the identification information of the manufacturer of the recorder/player to determine whether or not the manufacturer information is effective. That is, if the respective identification information is the same, then the manufacturer information item is effective. If not, the manufacturer information item may be not effective, thus requiring complete verification.

The above objects are achieved in accordance with the present invention with a rewritable recording medium to store audio/video (A/V) contents, including formatted information for the A/V contents, and manufacturer information to support the manufacturer's specific function, wherein the manufacturer information comprises an identification code of a manufacturer of a recording apparatus that last modified the content of the recording medium.

The above objects are achieved in accordance with the present invention with a recording apparatus for recording and/or editing audio, video, and/or information data on a rewritable recording medium, comprising a recording controller to produce A/V contents and formatted information for the A/V contents and manufacturer information to support the manufacturer's specific function, wherein the manufacturer information comprises an identification code of the manufacturer of a recording apparatus that last modified the content of the recording medium.

The above objects are achieved in accordance with the present invention with a reproducing apparatus for reproducing audio, video, and/or information data on a rewritable recording medium, comprising a reproducing controller to reproduce A/V contents and formatted information for the A/V contents and manufacturer information to support a manufacturer's specific function, wherein the manufacturer information comprises an identification code of the manufacturer of the recording apparatus that last modified the content of the recording medium.

The above objects are achieved in accordance with the present invention with a method of recording and/or editing audio, video, and/or information data on a rewritable recording medium, comprising recording an identification code of the manufacturer of a recording apparatus which last modified the contents of the recording medium by performing recording/editing on the recording medium.

The above objects are achieved in accordance with the present invention with a method of recording/reproducing audio, video, and/or information data on a rewritable recording medium with a recording/reproducing apparatus using manufacturer information recorded on the recording medium, comprising verifying a coincidence of an identification code of a manufacturer which last modified the contents of the recording medium and its own manufacturer identification code to determine whether its manufacturer specific information is effective.

BRIEF DESCRIPTION OF THE DRAWINGS

The above objects and advantages of the present invention will become more apparent by describing in detail a preferred embodiment thereof with reference to the attached drawings in which:

FIG. 6 is a table showing another example of detailed contents of a manufacturer information header according to the present invention;

FIG. 7 is a table showing the contents of a manufacturer information search pointer according to the present invention; and FIG. 8 is a table showing the contents of a manufacturer information item according to the present invention;

DESCRIPTION OF THE PREFERRED EMBODIMENTS

Hereinafter, preferred embodiments of a recording medium and a recorder/editor for storing manufacturer information for supporting specific functions of the manufacturer and a recorder/player for using manufacturer information for supporting specific functions of the manufacturer according to the present invention and preferred embodiments of a method therefor will be described.

Figure 1:
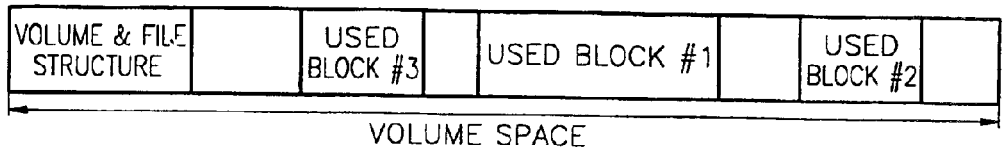
FIG. 1 shows a one-dimensional structure of a general recording medium.
Figure 2:
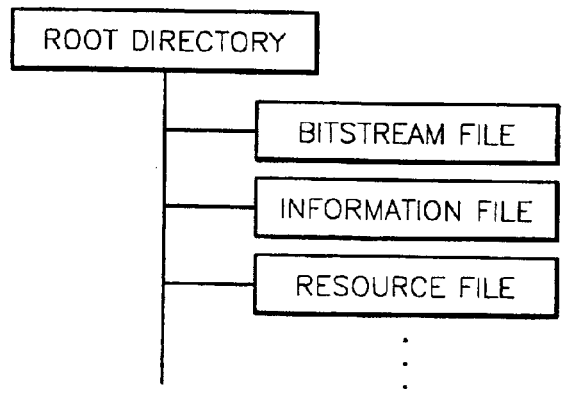
FIG. 2 shows the file structure of the recording medium shown in FIG. 1.
Figure 3:
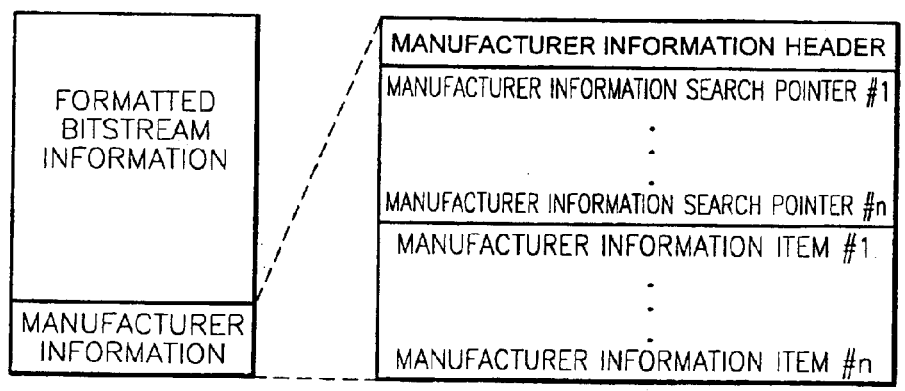
FIG. 3 shows the contents of the information file shown in FIG. 2.
Figures 4, 5:
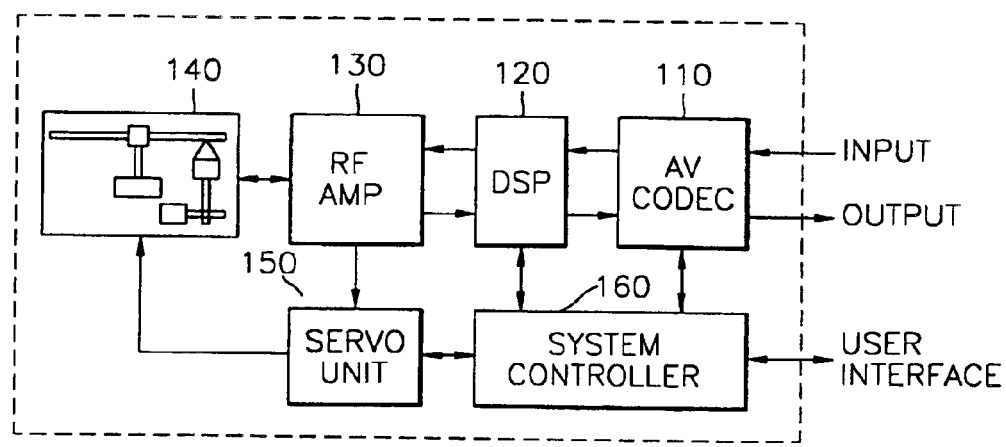
FIG. 4 is a block diagram of an optical recording and reproducing apparatus according to the present invention.
FIG. 5 is a table showing an example of detailed contents of a manufacturer information header for supporting a manufacturer specific function according to the present invention.

FIG. 4 is a block diagram of an optical recording and reproducing apparatus in accordance with the present invention. The function of an apparatus for recording A/V data on and reproducing A/V data from a recordable and rewritable recording medium is divided into recording and reproducing.

During recording, an A/V codec 110 compression-codes an A/V signal input by a predetermined compression coding scheme. A digital signal processor (DSP) 120 receives A/V data supplied from the A/V codec 110, adds parity data for an error correction code (ECC) process, and performs modulation by a predetermined modulation scheme. A radio frequency amplifier (RF AMP) 130 converts data supplied from the DSP 120 into an RF signal. A pick-up unit 140 drives a recording medium, records data corresponding to the RF signal from the RF AMP 130 on a recording medium, and includes an actuator for performing focusing and tracking. A servo unit 150 receives information required for controlling a servo from the RF AMP 130 and a system controller 160 and performs a stable servo operation. The system controller 160 controls the entire system, controls the A/V data to be recorded on the recording medium, and records information including information on the size and the position of the compressed data as well as manufacturer information on the recorder/editor performing the specific function, the recording/editing. Also, the system controller 160 determines whether the manufacturer information recorded on the recording medium is effective using the identification information on the recorder/editor performing the recording/editing functions by finally accessing the recording medium, and controls recording/editing operations using the determined manufacturer information.

During reproduction, the pick-up unit 140 provides an optical signal picked up from the recording medium in which data is stored. The RF AMP 130 converts the optical signal into an electrical signal and extracts the servo signal for performing the servo and extracts the modulated data. The DSP 120 demodulates the modulated data supplied from the RF AMP 130 corresponding to the modulation scheme used upon modulation, corrects errors by performing ECC, and removes the parity data. The servo unit 150 receives information required for controlling the servo from the RF AMP 130 and the system controller 160 and performs a stable servo operation. The A/V codec 110 decodes the compressed A/V data supplied from the DSP 120 and outputs an A/V signal. The system controller 160 controls the entire system to reproduce data using the information recorded on the recording medium, performing a user interface, i.e., processing the key input of the user. Also, the system controller 160 determines whether the manufacturer information recorded on the recording medium is effective using the identification information on the recorder/editor performing the recording/editing functions by finally accessing the recording medium, and controls reproducing operations using the determined manufacturer information.

FIG. 5 is a table showing an example of detailed contents included in a manufacturer information header for a manufacturer specific function according to the present invention. The table shown in FIG. 5 can be comprised of MNFI_Ns which is information on the number of manufacturer information items, a manufacturer identification code (LAST_MN) indicating the manufacturer of the recorder/editor which last modified the contents of the recording medium. Moreover, the table shown in FIG. 5 can include a product code (LAST_PROD) indicating the product model of the recorder/editor which last modified the recording medium, and an operation code (OP_CD) expressed by a predetermined code indicating information on an operation performed by the recorder/editor, for example, an operation of modifying A/V bitstream data on the recording medium by recording, editing, erasing, and a specific function other than simple reproduction.

The manufacturer identification code is for classifying different manufacturers, in which the respective manufacturers are expected to have unique values. Simple text data of the manufacturer's name can be used because it is very difficult to imagine that different manufacturers have the same name.

The operation code has compatibility since it must be understood by different manufacturers. The information on the recorder/editor performing the recording/editing by finally accessing the recording medium and the information on the performed operation are provided by recording such information on the manufacturer information header in each recorder/editor performing the recording/editing by accessing the recording medium. When only simple reproduction is performed, manufacturer identification information of the reproducing apparatus is not recorded on the manufacturer information header because there is no change in the contents of the recording medium.

Examples of using the manufacturer information using the above data structure are as follows. When the manufacturer A generates a manufacturer information item and records information on the recording medium and the manufacturer B edits the recording medium in the recorder/editor, the recorder/editor of the manufacturer B records the identification code of the manufacturer B, the product code of the recorder/editor and the operation code indicating information including that an editing operation has been performed on the manufacturer information header as shown in FIG. 5, before ejecting the recording medium.

When the data recorded on the recording medium is overwritten, edited, and reproduced using the manufacturer information item by the recorder, editor, and player of the manufacturer A, the identification information on the manufacturer which last used the recording medium, product information of the recorder/editor, and information on the operation performed in the manufacturer information header, it is determined whether the manufacturer information items to be used during recording, editing, and reproducing are effective.

If the manufacturer identification code recorded in the recording medium which identifies the manufacturer that last modified the recording medium is consistent with the concerned recorder/editor/player's manufacturer identification code, it is determined that the concerned manufacturer information item is effective. If the manufacturer identification code recorded in the recording medium is not consistent with the concerned manufacturer identification code, it must be determined whether the manufacturer information items to be used are effective by analyzing the entire contents of the recording medium. When the manufacturer information items are effective, they can be used.

Also, when the recorder/editor which last modified the recording medium is the current recorder/editor and the editing operation is finally performed, it is easily judged that the manufacturer information item for the manufacturer is effective since it is possible to update the manufacturer information item according to the recording/editing operation by analyzing the contents of the manufacturer information item corresponding to the modified contents. Accordingly, it is possible to reduce the time required to determine whether the manufacturer information items are effective. When the manufacturer information items are effective, it is possible to perform the recording, the editing, and/or reproduction using the manufacturer information items.

FIG. 6 is another example of a manufacturer information header according to the present invention. As shown in FIG. 6, MNFI_Ns indicates the number of manufacturer information items, MNFIT_EA indicates the last address of a manufacturer information, LAST_MN indicates an identification code of a manufacturer of a recorder/editor which last modified A/V contents. LAST_PROD indicates a code of a product which last modified the A/V contents. MN_CD indicates the manufacturer code corresponding to the number of manufacturer information items, PROD_CD indicates the product codes of the respective manufacturer information items. FILE_NAME indicates the file name of an additional file for individual information, and REC_TM indicates the time in which individual information was recorded. The MN_CD and/or PROD_CD and/or FILE_NAME and/or REC_TM can be recorded in the beginning part of the respective manufacturer information items.

To restrict the size of manufacturer information, there is a maximum number of MNFI_Ns (for example, up to 5). When the number of manufacturer information items exceeds the maximum number, the oldest records can be deleted. If the manufacturer information item has an additional file when the manufacturer information item is deleted, this file is also deleted. When a recorder/editor modifies the recording medium content and it has its own manufacturer information item, only the concerned manufacturer information is updated and other manufacturer information items should remain unchanged. When a recorder/editor modifies the recording medium content but it does not have its own manufacturer information item, even in this case, the identification code of the manufacturer which modifies the recording medium should be recorded.

MNFIT_EA is the last address of a manufacturer information, for example, having a relative block number (RBN) from the first byte position of the manufacturer information header. LAST_MN denotes a manufacturer identification code which last modified the A/V contents. It is mandatory to have this recorded when the A/V contents are modified by the recorder/editor even if the recorder/editor does not have the manufacturer information item therefor. LAST_PROD made by the manufacturer denotes a product code of the product which last modified the A/V contents. It must be recorded when the recorder/editor modifies the A/V contents even if the recorder/editor does not have the manufacturer information item therefor. Since the manufacturer identification codes must be classified according to the respective manufacturers, they preferably have unique values according to the respective manufacturers. Also, since a manufacturer may have various products, it is recommended that the manufacturer manage the product codes.

Namely, a set in which the A/V contents are modified in order to make the information in relation to real A/V contents identical to A/V contents must record the manufacturer identification information in the manufacturer identification code field (LAST_MN) of the manufacturer information header even if there is no manufacturer information item of its own. Also, when the recording medium is inserted into a set, it must be checked whether the real A/V contents are identical to the manufacturer's information item which is specific to the manufacturer in relation to the A/V contents of the recording medium. The first and easiest way is to check the identification code of the manufacturer which last modified the recording medium. When the A/V contents are modified by an other manufacturer's equipment, a concerned set must modify or update the information in relation to A/V contents.

MN_CD and PROD_CD are manufacturer codes and the product codes, as many as stored manufacturer information items, to indicate that each manufacturer information item belongs to which manufacturer and product. When the information for the manufacturer products exists in an additional file, FILE_NAME is the name of the file. If there is no file, the FILE_NAME is filled with a special value. REC_TM denotes the time when the information is recorded. MN_CD, REC_TM, PROD_CD, FILE_NAME can be recorded in the beginning part of the respective manufacturer information items.

FIG. 7 is a table showing the contents of a manufacturer information search pointer according to the present invention. FIG. 7 includes MNFI_SA which denotes the starting address of the manufacturer information item. The MNFI_SA is the starting address of the manufacturer information item, for example, having RBN from the first byte of the manufacturer information header.

FIG. 8 is a table showing the contents of the manufacturer information items according to the present invention, which has bytes of variable length. The maximum size of the information is, for example, 10 Kilobytes (KB). When the size of the information exceeds 10 KB, the additional information file of the manufacturer can be used.

As described above, according to the present invention, a recording medium is provided, which contains A/V data and formatted information to use the A/V data for recording and reproducing, and manufacturer information to support manufacturer specific function which cannot be implemented using the formatted information. Moreover, manufacturer information is provided to support multiple manufacturer information items. Such information also contains the identification code of the manufacturer which last modified the contents of the recording medium. This information can be used to check the effectiveness of its own manufacturer information item when the recording medium is recorded, edited, reproduced by multiple equipment of different manufacturers since the manufacturer information item which is specific to the manufacturer can not be managed by other manufactures equipment. Accordingly, it is possible to reduce the time taken to determine whether the manufacturer information items are effective.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of recording and/or editing content on a data recording medium, comprising:
    recording an identification information of a manufacturer of a recording apparatus that recorded or modified the content of the recording medium different from the identification information prior to the recording or the modification; and
    recording a last address of manufacturer information for the recording apparatus to identify the last address of the manufacturer information.

2. The method of claim 1, further comprising:
    recording a product identification code of the recording apparatus of the manufacturer that modified the content of the recording medium by performing recording/editing on the recording medium.

3. The method of claim 1, wherein the identification information corresponds to the manufacturer of the recording apparatus that last recorded or modified the content of the recording medium.

4. The method of claim 1, further comprising:
    recording a number of manufacturer information items, a file name of the additional file for individual information, and a time in which the individual information is recorded at a beginning part of respective manufacturer information items, wherein
    the manufacturer information comprises a manufacturer information header comprising at least one of the number of manufacturer information items, the identification information of the manufacturer of the recording apparatus that modified the content of the recording medium, product code information indicating a product model of the recording apparatus that modified the content of the recording medium, a manufacturer code corresponding to the number of manufacturer information items, product codes of the respective manufacturer information items, the file name of an additional file for individual information, and the time in which individual information is recorded.

5. A method of recording/reproducing content on a rewritable recording medium with a recording/reproducing apparatus using manufacturer information recorded on the recording medium, comprising:

verifying a coincidence of an identification information of a manufacturer of a device which recorded or modified the content of the recording medium and a manufacturer identification information of the recording/reproducing apparatus to determine whether a manufacturer specific information of the recording/reproducing apparatus is effective, wherein the identification information of the manufacturer is different from the identification information prior to the recording or the modification, and the manufacturer information comprises a last address of the manufacturer information for the recording/reproducing apparatus to identify the last address of the manufacturer information.

6. The method of claim 5, further comprising:
verifying the coincidence of an identification information of a product that modified the content of the recording medium and a product identification code of the recording/reproducing apparatus to determine whether the manufacturer specific information of the recording/reproducing apparatus is effective.

7. The method of claim 5, wherein the identification information of the manufacturer corresponds to the manufacturer of the recording apparatus that last modified the content of the recording medium.

8. A recording method of recording content on a rewritable recording medium, comprising:
modifying the content on the recording medium; and
recording manufacturer information comprising a manufacturer identification information of a recording apparatus indicating a manufacturer of the recording apparatus which recorded or modified the content of the recording medium different from the manufacturer identification information prior to the recording or the modification, wherein the manufacturer information comprises a last address of the manufacturer information for the recording apparatus to identify the last address of the manufacturer information.

9. The recording method of claim 8, further comprising:
recording a product information code indicating a product model of the recording apparatus that modified the content of the recording medium.

10. The recording method of claim 9, further comprising:
recording an operation code indicating information on an operation performed by the recording apparatus other than reproduction of the content of the recording medium.

11. The recording method of claim 10, wherein the operation code information is compatible for a plurality of different manufacturers.

12. The recording method of claim 8, further comprising:
recording a manufacturer information item specific to the manufacturer of the recording apparatus, and a manufacturer code to indicate the manufacturer of the manufacturer information item.

13. The recording method of claim 9, further comprising:
recording a manufacturer information item specific to the manufacturer, a manufacturer code to indicate the manufacturer of the recording apparatus of the manufacturer information item, and a product code to indicate a product model of the recording apparatus of the manufacturer information item.

14. The recording method of claim 13, further comprising:
recording time information indicating a time when the manufacturer information item is recorded on the recording medium.

15. The recording method of claim 13, further comprising:
recording the manufacturer code and the product code at a beginning part of the manufacturer information item.

16. The recording method of claim 12, further comprising:
recording a search pointer indicating a starting address of the manufacturer information item.

17. The recording method of claim 12, further comprising:
updating a number of total manufacturer information items recorded on the recording medium.

18. The recording method of claim 17, further comprising:
determining whether the number of total manufacturer information items exceeds a predetermined limit, and if so, deleting an oldest manufacturer information item stored on the recording medium.

19. The recording method of claim 9, further comprising:
recording an address of manufacturer information which includes the manufacturer identification information and the product information code.

20. The recording method of claim 10, further comprising:
recording an last address of manufacturer information which includes the manufacturer identification information, the product information code, and the operation code.

21. The recording method of claim 8, wherein the manufacturer identification information corresponds to the manufacturer of the recording apparatus that last modified the content of the recording medium.

22. A method of modifying content on a recording medium, comprising:
recording on the recording medium manufacturing information comprising a manufacturer identification information of a recording and reproducing apparatus indicating a manufacturer of the recording and reproducing apparatus that recorded or modified the content of the recording medium different from the manufacturer identification information prior to the recording or the modification, wherein the manufacturer information comprises a last address of the manufacturer information for the recording and reproducing apparatus to identify the last address of the manufacturer information; and
reading a manufacturer identification information, determining whether the content is effective based upon whether the read manufacturer identification information matches that of the recording and reproducing apparatus, and reading the content if the content is effective.

23. The method of claim 22, further comprising:
reading the content of the recording medium to determine whether the content is effective if the determination is that the read manufacturer identification information does not match that of the recording and reproducing apparatus, and reproducing the content read if the content read is determined to be effective.

24. The method of claim 22, further comprising:
updating only manufacturer information item specific to the manufacturer of the recording and reproducing apparatus, and not updating other manufacturer information items recorded on the recording medium.

25. The method of claim 22, wherein the manufacturer identification information corresponds to the manufacturer of the recording apparatus that last modified the content of the recording medium.

26. A reproduction method of reproducing content from a recording medium comprising manufacturer identification information, the reproduction method comprising:

reading manufacturer information comprising the manufacturer identification information of a manufacturer of an apparatus that recorded or modified the content of the recording medium different from the manufacturer identification information prior to the recording or the modification, wherein the manufacturer information comprises a last address of the manufacturer information for the apparatus to identify the last address of the manufacturer information; and determining whether to read the content based upon the read manufacturer identification information.

27. The reproduction method of claim 26, wherein the recording medium has a product information code indicating a product model of the apparatus that modified the content of the recording medium on the recording medium, the reproduction method further comprising:

reading the product model; and determining whether to read the content based upon the read product model.

28. The reproduction method of claim 26, wherein the recording medium has an operation code indicating information on an operation performed by the recording apparatus that modified the content of the recording medium, the reproduction method further comprising:

reading the operation code; and determining how to modify the content based upon the read operation code.

29. The reproduction method of claim 27, wherein the recording medium has a manufacturer information item specific to the manufacturer, and a manufacturer code to indicate the manufacturer of the manufacturer information item, the reproduction method further comprising:

reading the manufacturer code; and determining whether to read the manufacturer information item if the manufacturer code matches a code relating to the manufacturer of the reproducing apparatus.

30. The reproduction method of claim 27, wherein the recording medium has a manufacturer information item specific to the manufacturer, a manufacturer code to indicate the manufacturer of the recording apparatus of the manufacturer information item, and a product code to indicate a product model of the recording apparatus of the manufacturer information item, the reproduction method further comprising:

reading the manufacturer code and the product code; and determining whether to read the manufacturer information item if the manufacturer code matches a code relating to the manufacturer of the reproducing apparatus and the product code matches a code relating to the product model of the reproducing apparatus.

31. The reproduction method of claim 30, wherein the recording medium has time information indicating a time when the manufacturer information item is recorded on the recording medium, the reproduction method further comprising:

reading the time information and processing the read time information.

32. The reproduction method of claim 29, wherein the recording medium has a search pointer indicating a starting address of the manufacturer information item, the reproduction method further comprising:

reading the search pointer and then reading the manufacturer information item at the starting address thereof.

33. The reproduction method of claim 26, further comprising:

determining whether the read manufacturer identification information matches a code of a current reproducing apparatus relating to a manufacturer of the reproducing apparatus;

reading the content for reproduction if there is a match for reproduction of the content;

reading the content if there is not the match for analyzing the content; and reproducing the content if there is the match or if the analysis indicates the content is reproducible by a current reproducing.

34. The reproduction method of claim 26, wherein the manufacturer identification information corresponds to the manufacturer of the recording apparatus that last modified the content of the recording medium.

* * * * *

UNITED STATES PATENT AND TRADEMARK OFFICE
CERTIFICATE OF CORRECTION

| | | |
|---|---|---|
| PATENT NO. | : 6,937,815 B1 | Page 1 of 1 |
| APPLICATION NO. | : 09/610696 | |
| DATED | : August 30, 2005 | |
| INVENTOR(S) | : Seong-jin Moon et al. | |

It is certified that error appears in the above-identified patent and that said Letters Patent is hereby corrected as shown below:

Title Page, Item (56) References Cited, U.S. Patent Documents, insert
--5,404,520 A  4/1995  Sonobe--

Title Page, Item (56) References Cited, Other Publications,
change "U.S. Appl. No. 09/143,930" to --U.S. Appl. No. 10/143,930--.

Signed and Sealed this
Eighth Day of February, 2011

David J. Kappos
*Director of the United States Patent and Trademark Office*